UNITED STATES PATENT OFFICE.

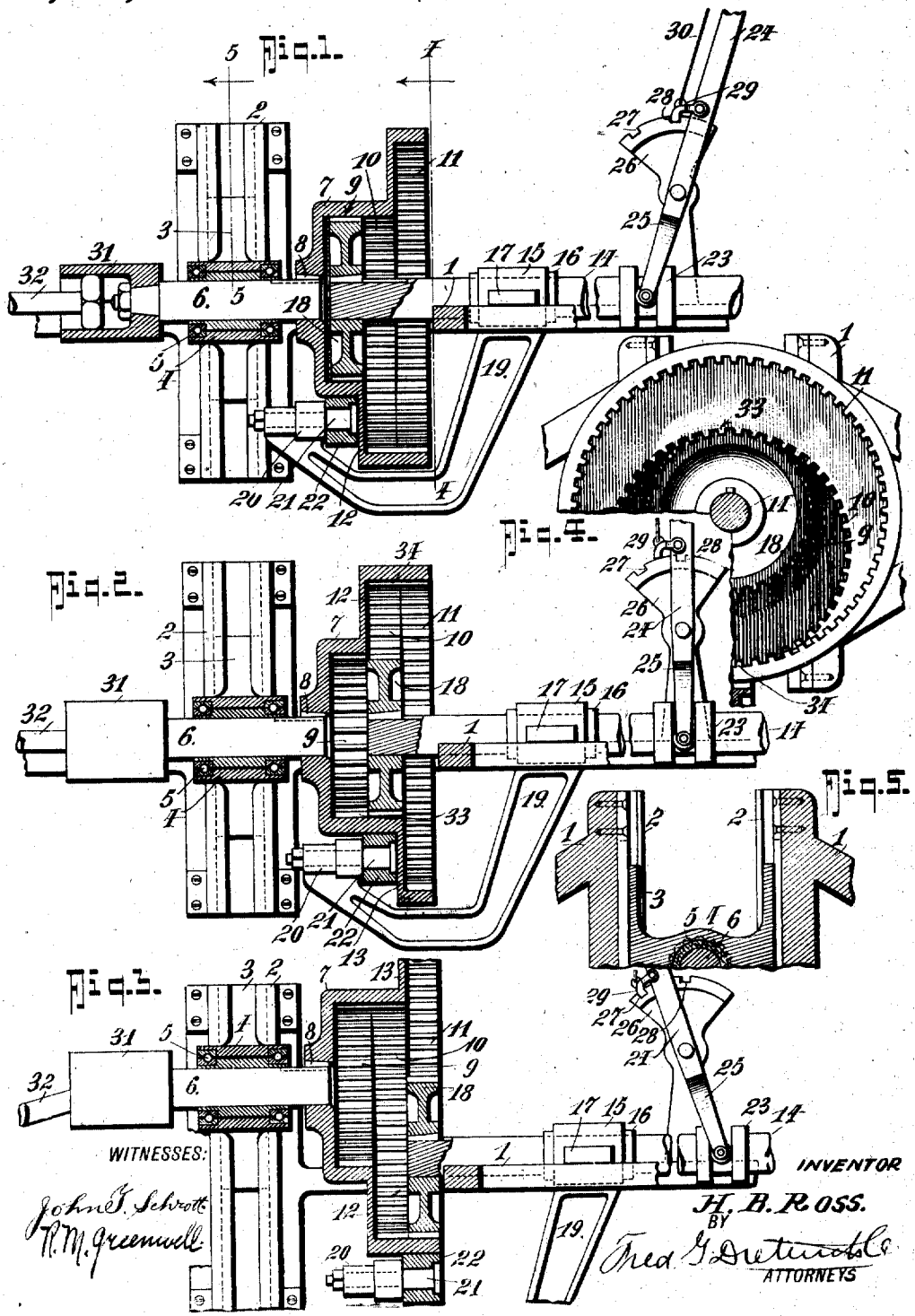

HARRY BEAUREGARD ROSS, OF DENVER, COLORADO, ASSIGNOR TO ROSS TRANSMISSION GEAR CO., INCORPORATED, OF DENVER, COLORADO.

TRANSMISSION-GEARING.

1,226,012.　　　Specification of Letters Patent.　　Patented May 15, 1917.

Application filed September 16, 1912. Serial No. 720,563.

*To all whom it may concern:*

Be it known that I, HARRY B. ROSS, a citizen of the United States, residing at Denver, in the county of Denver and State of Colorado, have invented new and useful Improvements in Transmission - Gearing, of which the following is a specification.

My invention is an improved variable speed transmission gearing embodying a set of concentric and eccentric internal gears on one shaft, to coöperate with a shiftable gear carried by the other shaft, with means for continuously keeping the shiftable gear in mesh with the concentric and eccentric gears, the latter being arranged so that when the shiftable gear is meshed with the smaller concentric gear such gears will be locked together to effect the direct drive.

The invention in its more specific nature includes those novel details of construction, combination and arrangement of parts, all of which will be first fully described and then be specifically pointed out in the appended claims, reference being had to the accompanying drawing, in which—

Figure 1 is a central longitudinal section and part elevation of a two speed forward gearing with the "high" or direct drive position of the parts indicated.

Fig. 2 is a view similar to Fig. 1 showing the position of the parts midway between the "high" and "low" positions.

Fig. 3 is a view similar to Figs. 1 and 2 showing the position of the parts when the "low" position is reached.

Fig. 4 is a section on the line 4—4 of Fig. 1.

Fig. 5 is a detail sectional view on the line 5—5 of Fig. 1.

In the drawing in which like numerals and letters of reference indicate like parts in all of the figures, 1 is a part of the framing which supports the transmission gearing and 2 is a slideway which is secured to any suitable part of the framing 1. Mounted to slide in the slideway is a bearing carriage 3 which has a bearing portion 4 through which the shaft 6 projects, suitable ball bearings 5 being provided to reduce friction. Mounted on one end of the shaft 6 is the internal gear member 7, the same being secured at 8 to turn with the shaft 6, and the gear member 7 has a set of internal gear faces 9, 10 and 11, the gear faces 9 and 11 being concentrically arranged while the gear face 10 is eccentric to the other gear faces. The diameter of the gear face 10 is such that one tooth of the same will continuously aline with one tooth of the gear face 9 while the diametrically opposite tooth of the gear face 10 will aline with the corresponding tooth of the gear face 11, as best shown in Figs. 1 and 3 of the drawings. The gear member 7 is provided with a web or shoulder 12 on its outer side at the plane of separation of the gear faces 9 and 10, and it is also provided with a similar shoulder 13 at the plane of separation between the gear faces 10 and 11 to form abutments against which the retaining roller 22 may engage to prevent the shifting of the gear 18 from one position to another, save when the proper teeth are in alinement, as will be later more clearly understood.

The shaft 14, which in this instance is a driving shaft, carries a sleeve 15 which swivels on the shaft between the collars 16 and which has lateral lugs 17 to engage a portion of the frame 1, and thereby prevent turning of the sleeve 15 with relation to the frame. The shaft 14 carries the gear 18 which is of a diameter corresponding to that of the gear face 9 so that when it is in engagement with the gear face 9 as indicated in Fig. 1 all teeth of the gear 18 and the gear face 9 will be in mesh to effect a direct connection between the shafts 14 and 6, it being understood that the gear 18 is keyed or otherwise secured to the shaft 14. 19 is an arm carried by the sleeve 15 to project around the gear member 7, and the arm 19 has a portion 20 which carries the spindle 21 on which the roller 22 is mounted. The roller 22 continuously engages the outer periphery of the gear member 7 and maintains a fixed relation to the gear 18.

In order to shift the shaft 14 in the direction of its axis the shaft may be provided with collars 23 between which the forked end 25 of a gear shifting lever 24 may project. The lever 24 may coöperate with an arc segment 26 having notches 27 and 28 to coöperate with the latch 29 in holding the lever 24 either in its "low" or "high" positions as the case may be, it being understood that the latch may be operated with the usual rod 30 or any other desired means may be provided for shifting the arm 19 and gear 18 together in the direction of the axes of the shafts 14 and 6.

The shaft 6, which in this instance is a driven shaft, is provided with a universal joint 31 that connects the shaft 6 with the driven shaft section 32.

In operation assume the parts to be in the position shown in Fig. 1. It will be observed that the gear 18 is in mesh with the concentric gear face 9 and as all teeth of such gears are in mesh no relative rotation will take place between the gear 18 and the gear member 7 but such gears will turn together as one, thereby forming a direct connection between the shafts 6 and 14 and applying the same number of revolutions to the shaft 6 as occur in the shaft 14. This gives the direct drive. Now assume that it is desired to shift the gearing into position to impart a lesser number of revolutions to the shaft 6, than occur in the shaft 14, or in other words, supposing that it is desired to shift to the low position; the operator moves the lever 24, from the position shown in Fig. 1, through the position shown in Fig. 2, to the position shown in Fig. 3. In passing from the position shown in Fig. 1, the first movement of the lever 24 will be to the position shown in Fig. 2 which brings the gear 18 into mesh with the eccentric gear face 10. As the shaft 6 makes a half revolution, it is moved laterally through the medium of the slide 2 and carriage 3 to the position shown in Fig. 3 at which time the remaining movement of the lever is effected to bring the gear 18 into mesh with the large concentric gear 11, thus giving the low speed drive. The roller 20, maintaining a constant relation to the gear 18, holds that gear in mesh with any of the gear faces of the gear member 7 and by engaging the web or abutments 12 and 13 prevents the shifting of the gear 18 until the proper time which occurs when the common gear tooth 33 between the gear sections 9 and 10, alines with the corresponding gear teeth of the gear 18 and when the common gear tooth 34 between the gear faces 10 and 11 alines with the corresponding teeth of the gear 18.

In shifting from the low position of Fig. 3 back to the high position of Fig. 1, the reverse operation takes place and the gear 18 is prevented from shifting at the wrong time by contact with the adjacent inner surfaces of the walls 13 and 12, as the case may be as will be clearly understood by reference to Fig. 3 of the drawings.

From the foregoing description taken in connection with the accompanying drawings, the complete construction, operation and advantages of the invention will be apparent to those skilled in the art.

What I claim is:

1. In a transmission gearing, a first and a second shaft, a gear carried by said first shaft, an internal gear member carried by said second shaft within which said gear operates, said internal gear member having a set of alternately disposed concentric and eccentric gear surfaces, means for shifting said gear into mesh with the respective internal gear surfaces, and means for holding said gear in mesh with said gear surfaces, said last-named means comprising an arm mounted on said first shaft to shift said shiftable gear, and a connection between said arm and said internal gear member substantially as shown and described.

2. In a transmission gearing, a first and a second shaft, a gear carried by said first shaft, an internal gear member carried by said second shaft within which said gear operates, said internal gear member having a set of alternately disposed concentric and eccentric gear surfaces, means for shifting said gear into mesh with the respective internal gear surfaces, and means for holding said gear in mesh with said gear surfaces, said last-named means comprising an arm mounted on said first shaft to shift said shiftable gear, and a connection between said arm and said internal gear member, said set of concentric and eccentric gear surfaces including a concentric gear surface of the same diameter as that of said shiftable gear, in virtue of which when said shiftable gear is in mesh with the same said internal gear member and said shiftable gear will turn as one to effect a direct connection between said shafts.

3. In a variable speed gearing, the combination of a shaft and an internal gear member fast thereon and having a set of internal gear faces a plurality of which are concentrically arranged and another eccentrically disposed with relation thereto, said gear member having shoulders on its outer side in different planes forming abutments, a second shaft, a gear carried thereby for coöperation with said internal gear, a movable member and a roller carried thereby for continuous engagement with the outer periphery of said gear member and coöperable with said abutments.

4. In variable speed gearing, the combination of a driving element, a driven element comprising change speed gears, an operating device for shifting the driving element and for moving the change speed gears of the driven member to effect changes of speed of the driven member, said driven member having external abutments in different planes, and a roller movable with the driving element and arranged for continuous engagement with the outer periphery of the driven member and for coöperation with said abutments to prevent shifting of the driving element from one position to another.

5. In variable speed gearing the combination of a driving gear, a driven gear member composed of gears of different diameters, said gear member having exterior shoulders in different planes forming abutments, means for shifting the driving gear, and means movable with the latter for continuous engagement with the outer periphery of said gear member and coöperable with said abutments to prevent shifting of the driving gear.

HARRY BEAUREGARD ROSS.

Witnesses:
OLIVER E. BARTHEL,
ANNA M. SHANNON.